United States Patent [19]

Swedberg

[11] Patent Number: 4,569,644
[45] Date of Patent: Feb. 11, 1986

[54] LOW SPEED HIGH TORQUE MOTOR WITH GEAR REDUCTION

[75] Inventor: Nils E. Swedberg, Chanhassen, Minn.

[73] Assignee: Eaton Corporation, Cleveland, Ohio

[21] Appl. No.: 569,875

[22] Filed: Jan. 11, 1984

[51] Int. Cl.[4] .......................... F03C 2/08; F16H 1/28
[52] U.S. Cl. ............................. 418/61 B; 74/421 A; 74/805
[58] Field of Search ............. 418/60, 61 B; 74/421 A, 74/805

[56] References Cited

U.S. PATENT DOCUMENTS

| | | | |
|---|---|---|---|
| 2,240,874 | 5/1941 | Thomas et al. | 418/60 |
| 2,988,065 | 6/1961 | Wankel et al. | 74/805 |
| 3,853,435 | 12/1974 | Ogasahara et al. | 418/61 B |
| 3,910,732 | 10/1975 | Lusztig | 418/60 |
| 4,134,713 | 1/1979 | Binaut | 74/421 A |

*Primary Examiner*—John J. Vrablik
*Attorney, Agent, or Firm*—C. H. Grace; L. J. Kasper

[57] ABSTRACT

A low speed high torque motor-gear reducer assembly is disclosed of the type having a first gerotor (motoring gerotor) including a ring member (41) having (N+1) internal teeth (47) and a star (49) having (N) external teeth. A second gerotor (reduction gerotor) includes a ring (85) having (M+1; wherein M does not equal N) internal teeth (89) and a star (91) having (M) external teeth. The internally-toothed portion of the second gerotor is fixed by means of a flange (81) to an output shaft (25). Pressurized fluid is communicated only to the motoring gerotor whereby the output shaft rotates at a speed reduced from the speed of rotation of the star (49) by a reduction factor R wherein:

$$R = \frac{M+1}{M-N}.$$

In accordance with one embodiment of the invention, a third gerotor (support gerotor) is included having a star (103) identical to the star (49) and being in engagement with an intermediate shaft (97) such that the stars (49) and (103) orbit and rotate in unison. The support gerotor absorbs reaction forces transmitted to the intermediate shaft (97) from the reduction gerotor.

14 Claims, 4 Drawing Figures

LOW SPEED HIGH TORQUE MOTOR WITH GEAR REDUCTION

BACKGROUND OF THE DISCLOSURE

The present invention relates to low speed high torque (LSHT) gerotor motors, and more particularly to such motors which are associated with a gear reduction device, to further reduce the output speed of the motor and further increase the output torque of the motor.

Gerotor motors of the LSHT type are now quite well known in the art, and have been a substantial commercial success. Typically, a LSHT gerotor motor includes a gerotor displacement mechanism, valving for directing fluid from an inlet port to the expanding volume chambers of the gerotor, and for porting return fluid from the contracting volume chambers of the gerotor to the outlet port. Normally, the internally-toothed member of the gerotor is fixed to the motor housing, and the externally-toothed member orbits and rotates therein, in response to the introduction of pressurized fluid. The rotational component of the orbital and rotational movement of the externally-toothed member is transmitted to a rotating output shaft, typically by means of a universal connection, such as a shaft having crowned splines at each end.

A conventional LSHT gerotor motor made and sold commercially by the assignee of the present invention in which the gerotor element has a displacement of about 8.0 cubic inches per revolution would generate an output torque of about 2,100 inch pounds, with the output shaft rotating about 550 rpm, when fluid is communicated to the motor at a pressure differential of 2,000 psi and a flow rate of about 20 gpm.

In many applications for LSHT motors, such as wheel drives and winch drives, it is desirable to provide a driving force having an even higher torque, and an even lower speed. As long as LSHT gerotor motors have been in use, it has been common practice in the art to combine the motor with some sort of external, add-on gear reduction device for applications requiring higher torques and lower speeds. However, the addition of an external gear reducer to the gerotor motor is undesirable because it substantially increases the overall size, weight, and cost of the drive package. Thus, for many years there has been a need for a LSHT gerotor motor-gear reducer assembly not having the disadvantages of those in commercial use, but as of the filing of the present application, very low speed, very high torque drive packages almost always still consist of a gerotor motor and a gear reducer, purchased as separate units from separate suppliers.

U.S. Pat. No. 2,240,874 discloses a gerotor motor which utilizes a compound epicyclic gear train to provide a built-in gear reduction capability. The device shown in the '874 patent includes two gerotor elements, with the ring of the first gerotor being fixed, the stars of the first gerotor and the second gerotor being connected for orbital and rotational movement together, and the ring of the second gerotor element being connected to the output shaft. The ring and star of the first gerotor have a different number of teeth or lobes than the ring and star, respectively, of the second gerotor. In the '874 patent, in the first gerotor, the ring had 15 teeth and the star had 14 teeth, and in the second gerotor the ring had 14 teeth and the star had 13 teeth. Because of this difference in the number of teeth, as described in greater detail in the '874 patent, the result was a reduction ratio of 14:1, i.e., the output shaft generating a torque about 14 times that generated by the rotation of the stars, and rotating at a rate about 1/14 that of the stars.

Despite the teachings of U.S. Pat. No. 2,240,874 regarding the use of two gerotors to provide a built-in gear reduction, there has apparently never been any widespread commercialization of a device embodying the concepts taught therein, and the need for a LSHT motor-gear reducer package has continued to exist up until the time of the present invention, especially in the field of mobile hydraulics.

It should be noted that in the device of U.S. Pat. No. 2,240,874, pressurized fluid is communicated from the inlet port to the expanding volume chambers of both of the gerotor elements, thus requiring substantially more complicated and expensive valving than is commonly required in commercial LSHT motors. In addition, because fluid is communicated to and from the gerotors through an eccentric portion of a central shaft, the rings and stars of the gerotors must be quite large to accommodate this shaft and all the valving ports and passages, thus making the gerotor elements prohibitively expensive. Finally, the particular configuration used in the device of the '874 patent necessitated the use of seven separate bearing sets which also would be prohibitively expensive in a commercial device.

SUMMARY OF THE INVENTION

Accordingly, it is an object of the present invention to provide a LSHT motor-gear reducer package which is substantially smaller and less expensive than those in commercial use.

It is a further object of the present invention to provide a LSHT motor-gear reducer package which utilizes the compound epicyclic gear train principles utilized by the device shown in U.S. Pat. No. 2,240,874, but which is commercially and economically feasible.

It is a further object of the present invention to provide a motor-gear reducer device which eliminates the need for gerotor and/or gearing elements of special configurations, but instead, makes it possible to utilize standard, readily available gerotor gear sets.

It is a related object of the present invention to provide such a gear-reducing device for which the output reduction ratio is flexible, i.e., the reduction ratio can be changed substantially from one design to the next, without changing any part of the device except the output gerotor element.

The above and other objects of the present invention are accomplished by the provision of a rotary fluid pressure device of the type including housing means defining fluid inlet and fluid outlet means, a first gerotor associated with the housing including a ring fixed relative to the housing and having a plurality (N+1) of internal teeth and a star having a plurality (N) of external teeth. The star is disposed within the ring at an eccentricity ($E_1$) for relative orbital and rotational movement therein. The teeth of the ring and star interengage to define expanding and contracting fluid volume chambers during the relative movement therebetween. Valve means is disposed within the housing and a second gerotor is associated with the housing and includes a ring having a plurality (M+1; wherin N does not equal M) of internal teeth, and a star having a plurality (M) of external teeth. The second star is disposed within the second ring at an eccentricity ($E_2$; wherein $E_1$ is equal to $E_2$) for orbital and rotational movement relative thereto. The teeth of the second ring and star interengage to define expanding and contracting chambers during the relative movement. An output shaft means is associated with the housing and is rotatably supported for only rotational movement. The ring of the second gerotor is fixed relative to the output shaft for rotational movement therewith. Intermediate shaft means is in engagement with the stars of each of the gerotors for orbital and rotational movement therewith.

The device is characterized by the valve means being operable to communicate fluid from the fluid inlet means substantially only to the expanding fluid volume chambers of the first gerotor, and from substantially only the contracting volume chambers of the first gerotor to the fluid outlet means. As a result, the input-output shaft means rotates at a speed which is reduced from the speed of rotation of the star of the first gerotor by a reduction factor (R) wherein:

$$R = \frac{M + 1}{M - N}$$

In accordance with a further aspect of the present invention, the rotary fluid pressure device is characterized by a third gerotor associated with the housing and including a ring member fixed relative to the housing and having a plurality (N+1) of internal teeth, and a star having a plurality (N) of external teeth. The star of the third gerotor is disposed within the ring at an eccentricity ($E_3$; wherein $E_3=E_2=E_1$) for relative orbital rotational movement therein. The teeth of the ring and star interengage to define expanding and contracting chambers during the relative movement. The star of the third gerotor is in engagement with the intermediate shaft means to absorb reaction forces transmitted to the intermediate shaft means from the second gerotor.

DESCRIPTION OF THE PREFERRED EMBODIMENTS

Figure 1:
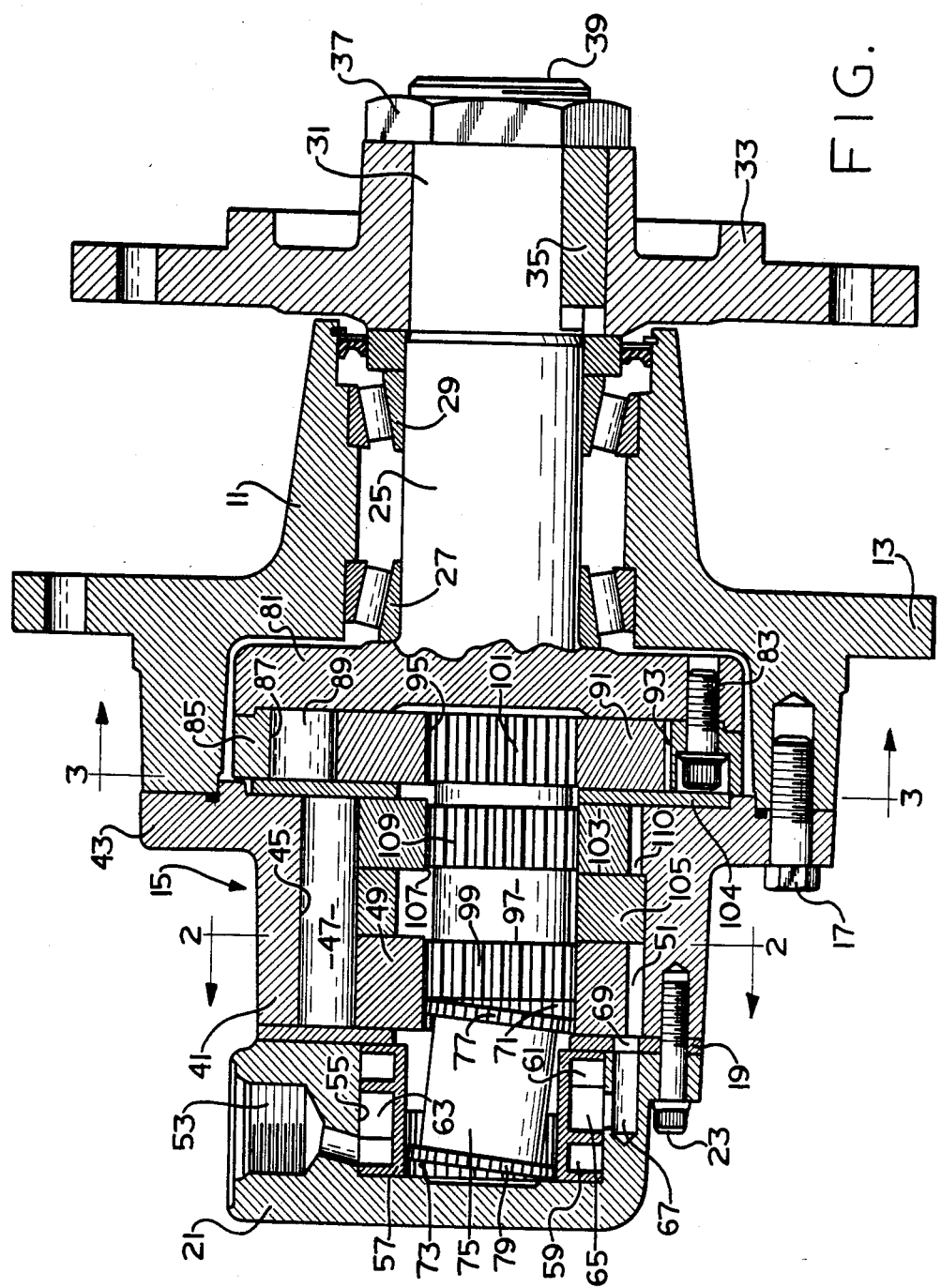
FIG. 1 is an axial cross-section of a LSHT gerotor motor-gear reducer assembly made in accordance with the present invention.

Referring now to the drawings, which are not intended to limit the invention, FIG. 1 is an axial cross-section of a LSHT motor-gear reducer assembly made in accordance with the present invention. The motor-reducer device comprises a plurality of sections held together by various fastening means. More specifically, the device includes a bearing housing portion 11 which includes, integral therewith, a mounting flange 13 which is suitable for mounting the entire device relative to an object such as the chassis of a vehicle (not shown).

The device further includes a displacement portion, generally designated 15, which is attached to the bearing housing portion 11 by means of a plurality of bolts 17. The device further includes a port plate 19 and a valve housing 21 which are attached to the displacement portion 15 by means of a plurality of bolts 23.

Disposed within the bearing housing portion 11 is an output shaft 25, which is supported for rotation within the bearing housing 11 by means of a pair of bearing sets 27 and 29. The output shaft 25 includes a forward shaft portion 31. A wheel-mounting flange 33 is disposed on the shaft portion 31 and connected for rotation therewith by means of a key 35, while being restrained from relative axial movement by means of a nut 37 which is in threaded engagement with an externally threaded portion 39 of the forward shaft portion 31. Typically, the wheel-mounting flange 33 is adapted to be attached to a vehicle wheel, to provide drive torque thereto.

Figure 2:
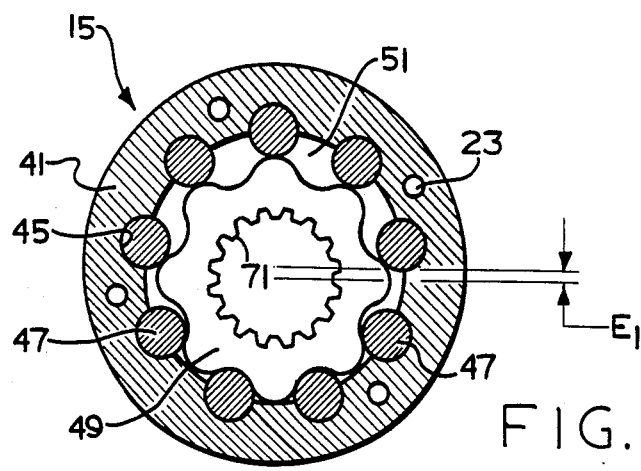
FIG. 2 is a transverse cross-section taken on line 2—2 of FIG. 1 with the intermediate shaft removed.

Referring now to FIG. 2, in conjunction with FIG. 1, it may be seen that the displacement portion 15 includes a housing member 41 including an integral flange portion 43 (FIG. 1 only), through which the bolts 17 extend. The housing member 41 also defines a plurality of internally threaded bores which receive the bolts 23, which extend through the port plate 19 and valve housing 21.

The housing member 41 defines a plurality of semi-cylindrical pockets 45, and disposed in each of the pockets 45 is a cylindrical roller 47. The housing member 41 and the plurality of rollers 47 together comprise the internally-toothed ring of a first gerotor displacement mechanism which, because of the use of the rollers 47, may also be referred to as a roller gerotor displacement mechanism, as is well known in the art.

An externally-toothed star member 49 is disposed within the set of rollers 47 at an eccentricity $E_1$, such that the rollers 47 and the teeth of the star 49 interengage during orbital and rotational movement of the star 49 to define a plurality of expanding and contracting fluid volume chambers 51, as is also well known in the art.

The valve housing portion 21 defines a fluid inlet port 53 and a fluid outlet port (not shown). The housing portion 21 defines a cylindrical internal surface 55, and disposed therein is a cylindrical spool valve member 57 of the general type which is well known in the art and will be described only briefly herein. The spool valve 57 defines an annular groove 59 which is in continuous fluid communication with the inlet port 53, and an annular groove 61 which is in continuous fluid communication with the outlet port. The spool valve 57 further defines a plurality of axial slots 63 which are in communication with the annular groove 59, and a plurality of axial slots 65 which are in fluid communication with the annular groove 61, as is well known in the art.

The valve housing portion 21 defines a plurality of axial passages 67, and the port plate 19 defines a plurality of corresponding openings 69, the number of passages 67 and openings 69 corresponding to the number of expanding and contracting volume chambers 51 as is well known in the art. In operation, pressurized fluid is communicated to the inlet port 53, and into the annular groove 59 and axial slots 63, then through certain of the axial passages 67 which are in communication with the openings 69 which are in alignment with those volume chambers 51 which are expanding at that particular moment. At the same time, return fluid flows from the volume chambers 51 which are contracting, through the corresponding openings 69 and axial passages 67, then into the axial slots 65, annular groove 61, and out the outlet port (not shown) to the system reservoir.

In order to maintain proper timing between the valve member 57 and the movement of the star 49, the star 49 defines a set of straight internal splines 71, and the valve member 57 defines a similar set of straight internal splines 73. A valve drive shaft 75 is provided, and includes two sets of external splines 77 and 79 which are in engagement with the sets of internal splines 71 and 73, respectively. Thus, the valve member 57 rotates in synchronism with the rotational component of the movement of the star 49.

Figure 3:
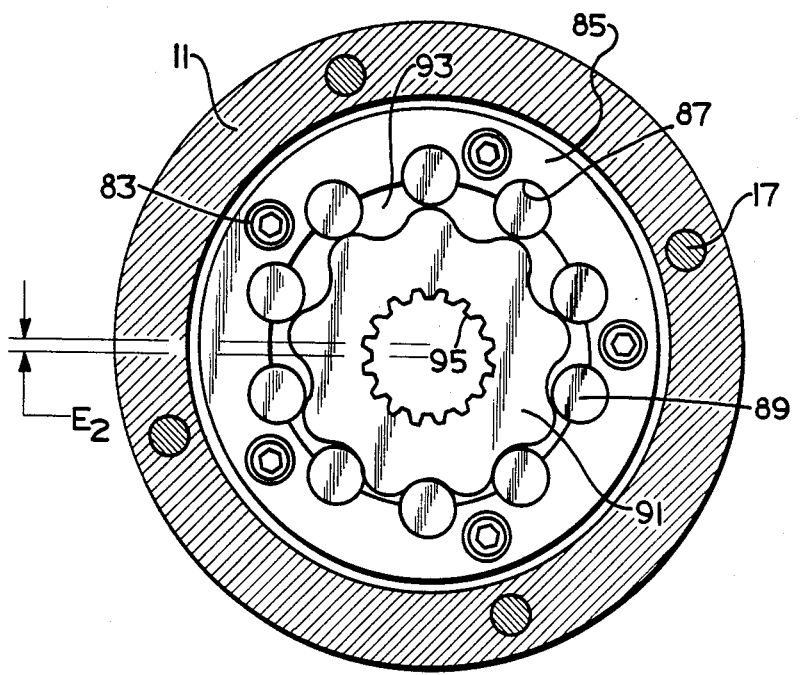
FIG. 3 is a transverse cross-section taken on line 3—3 of FIG. 1 also with the intermediate shaft removed.

The output shaft 25 includes, at its inner end a flange portion 81, to which is attached, by means of a plurality of bolts 83, an annular member 85. As may best be seen in FIG. 3, the annular member 85 defines a plurality of semi-cylindrical pockets 87, and disposed in each of the pockets 87 is a cylindrical roller 89. The annular member 85 and the plurality of rollers 89 together comprise the internally-toothed ring of a second gerotor displacement mechanism which may also be referred to as a roller gerotor mechanism.

An externally-toothed star member 91 is disposed within the set of rollers 89 at an eccentricity $E_2$, such that the rollers 89 and the teeth of the star 91 interengage during orbital and rotational movement of the star 91 to define a plurality of expanding and contracting chambers 93. The star member 91 defines a set of straight, internal splines 95, which are preferably identical to the internal splines 71 defined by the star 49. An intermediate shaft 97 includes a set of straight external splines 99 in engagement with the internal splines 71, and a set of straight external splines 101 in engagement with the internal splines 95. It is an important advantage of the device of the present invention that only straight splines are used in transmitting torque from the first gerotor mechanism (star 49) to the output shaft 25. The use of only straight splines provides substantially greater spline contact area, resulting in improved spline life and substantially greater torque transmitting capability.

It is an important feature of the present invention that the second gerotor mechanism (star 91) be the same as the first gerotor in certain ways, and different in certain ways. It is essential that the eccentricities of the two gerotors be the same, i.e., $E_2$ must equal $E_1$. On the other hand, as may be seen by comparing FIGS. 2 and 3, the number of internal and external teeth in the two gerotors is different. In the first gerotor, (FIG. 2) the star 49 has eight external teeth and there are nine of the internal teeth (rollers 47). In the second gerotor (FIG. 3) the star 91 has nine external teeth and there are ten internal teeth (rollers 89). In the present invention, the first gerotor may also be referred to as the motoring or powered gerotor, while the second gerotor may be referred to as the reduction gerotor. It should be noted that fluid is communicated only to the expanding and contracting volume chambers 51 of the first gerotor. No fluid is communicated to the expanding and contracting chambers 93 of the second gerotor, although it is probable that during operation of the device, there would be a certain amount of leakage fluid in the second gerotor acting as lubrication fluid. With the internally-toothed portion of the first gerotor fixed, the star 49 is free to orbit and rotate, as is the star member 91 of the second gerotor. However, the internally-toothed portion (member 85 and rollers 89) of the second gerotor is connected to the output shaft 25 as described previously. Because the number of external teeth on the star 49 differs from the number of external teeth on the star 91, the angular lobe or tooth spacing is different, and this difference results in rotation of the internally-toothed portion of the second gerotor and the flange portion 81 and output shaft 25. This output rotation is at a speed which is reduced, relative to the speed of rotation of the star 49, by a reduction factor R which is determined by the following equation:

$$R = \frac{M + 1}{M - N}.$$

Wherein M equals the number of external teeth on the star 91; and N = the number of external teeth on the star 49. In the subject embodiment of the invention, the reduction factor R would be (9+1) divided by (9−8), or R = ten. Therefore, the output speed of the shaft 25 would be one-tenth the rotational speed of the star 49, and the torque output capability would be increased by a factor of 10.

One important aspect of the present invention is the ability to provide a LSHT motor-gear reducer device which is relatively simple and inexpensive, partly by making use of the compound epicyclic gear train arrangement illustrated and described herein. One important feature of the present invention which makes it possible to achieve this objective is porting pressurized fluid only to the motoring gerotor (first gerotor) while using the second gerotor only as a reduction gerotor. Such an arrangement greatly simplifies both the overall arrangement of the device and the construction details thereof.

An additional feature of the present invention relates to the discovery that employing a compound epicyclic gear train arrangement without a complicated bearing and support arrangement, can result in the generation of reaction forces which can cause binding of the motor. Therefore, an important aspect of the present invention is the provision of a support arrangement for the intermediate shaft 97 which is simple and inexpensive, while still being effective to absorb reaction forces generated in the reduction gerotor and prevent binding of the motor.

In the embodiment of FIG. 1, the required support means comprises a third gerotor mechanism (support gerotor). Although the third gerotor could, within the scope of the invention, comprise a totally separate gerotor mechanism, it is a worthwhile feature of the invention that the third gerotor includes the housing member 41, pockets 45 and rollers 47 which comprised the internally-toothed portion of the first gerotor. The third gerotor further includes an externally-toothed star member 103 disposed at the right end in FIG. 1 of the set of rollers 47. Disposed between the second gerotor and the third gerotor is a wear plate 104, and disposed between the star 103 and the star 49 is a spacer member 105 the function of which will be described in greater detail subsequently.

The star 103 defines a set of straight internal splines 107, and the intermediate shaft 97 defines a set of external splines 109 in engagement with the internal splines 107. It is a significant feature of this embodiment that the third gerotor be substantially identical to the first gerotor, such that no view of the third gerotor is included herein, but instead, the gerotor geometry shown in FIG. 2 is also representative of the third gerotor. For example, the star 103 is disposed within the set of rollers 47 at an eccentricity $E_3$ (not shown), such that the rollers 47 and the teeth of the star 103 interengage during orbital and rotational movement of the star 103 to define a plurality of expanding and contracting chambers 110 which are substantially identical to the chambers 51 in the first gerotor. It is important that the eccentricity $E_3$ is equal to $E_2$ is equal to $E_1$ to provide synchronous orbital and rotational movement of all three stars 49, 91, and 103. Furthermore, the star 103 has the same number of external teeth and the same contour as the star 49. Also, because the rollers 47 are common to both the first and third gerotors, it is apparent that the roller diameters and roller base circles are the same for the first and third gerotors. However, if the first and third gerotors were totally separate elements, it would be necessary to insure that the roller diameter and roller base circle were the same for both, i.e., that the tooth geometry of the internal teeth would be the same for both the first and third gerotors.

As was noted previously, pressurized fluid is communicated only to the expanding and contracting volume chambers 51. Therefore, the primary function of the spacer member 105, in addition to separating the stars 49 and 103, is to extend radially outwardly to the housing member 41 and rollers 47, thus preventing any communication of fluid between the chambers 51 and the chambers 110.

In the subject embodiment, the stars 49 and 103 orbit and rotate synchronously, thus preventing any tilting or cocking of the intermediate shaft 97. As a result, any reaction forces transmitted from the annular member 85 and rollers 89 to the star 91 are absorbed by the third gerotor to permit relatively smooth, continuous operation of the device with an extremely low speed, high torque output. Referring again to the sample flows, pressures, etc., which were cited in the background of this specification, if the first gerotor in the subject embodiment had a displacement of about 8.0 cubic inches per revolution, and fluid would be communicated to the motor at a pressure differential of 2,000 psi and a flow rate of about 20 gpm, the output shaft 25 would have an output torque of about 21,000 inch pounds, with the shaft 25 rotating about 55 rpm. It will be apparent to those skilled in the art that obtaining such high torques at such low speeds from a package as small and relatively simple and inexpensive as the device in FIG. 1 fills a very significant, long-felt need in the art.

In order to test the significance of the support gerotor (third gerotor), a unit substantially as shown in FIG. 1 was built by the assignee of the present invention and tested with and without the support gerotor. In the sample unit, the first gerotor had a displacement of about 19 cubic inches per revolution. Pressurized fluid was communicated to the device at a 750 psi differential, and the torque generated was about 7,600 inch pounds with the support gerotor included. Next, the star 103 of the third gerotor was removed and replaced by a simple spacer member between the spacer 105 and wear plate 104. Without the support gerotor, it was found that the motor locked up, and the output shaft would not turn, when fluid was communicated to the motor at a pressure differential of only about 250 psi, i.e., the motor would operate at pressures below 250 psi, but not above.

FIG. 4 EMBODIMENT

Figure 4:
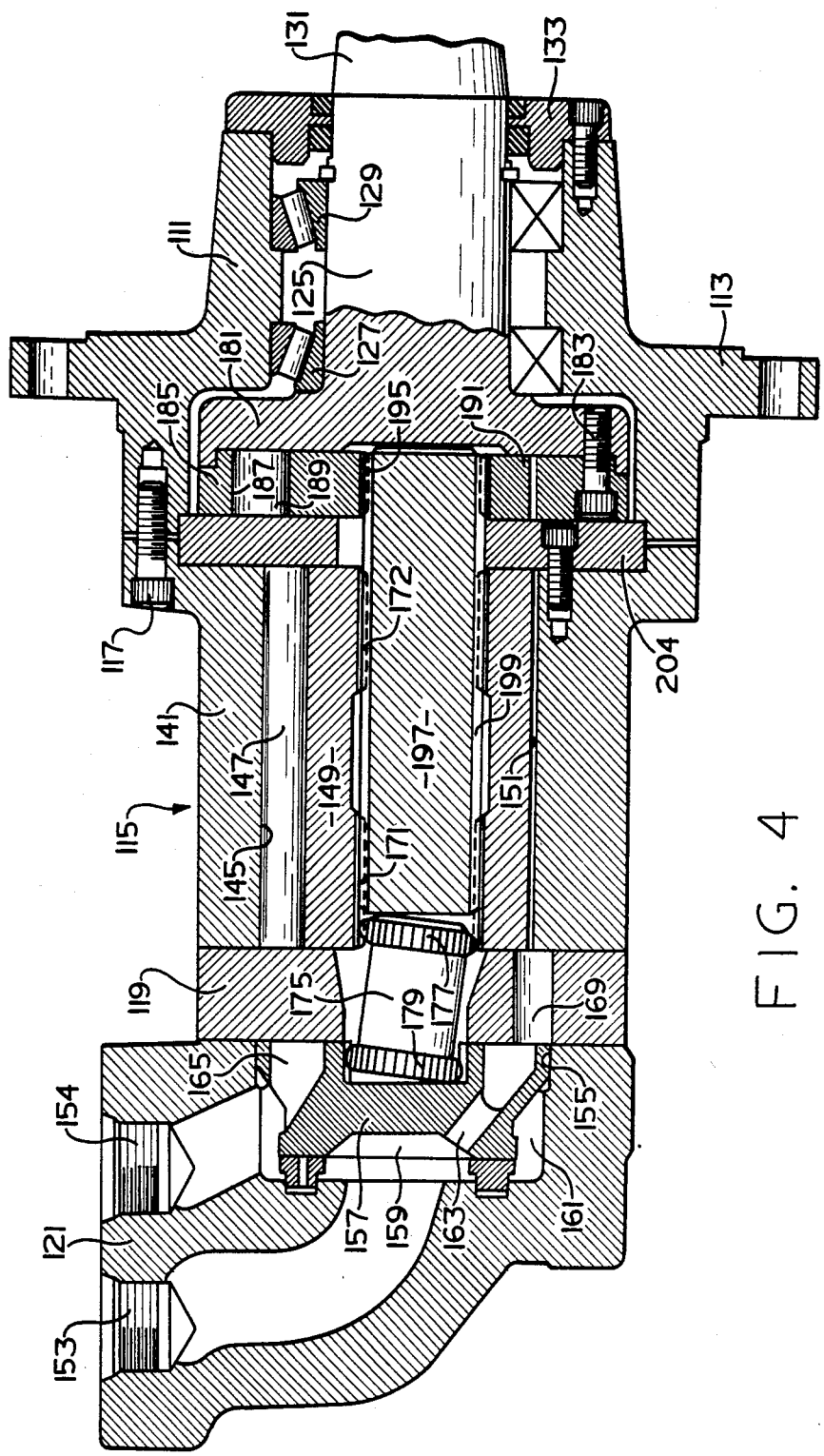
FIG. 4 is an axial cross-section of an alternative embodiment of the present invention.

Referring now to FIG. 4 there is illustrated an alternative embodiment of the invention in which those elements which are the same or similar to elements in FIG. 1 bear the same numeral as in FIG. 1, plus 100. In view of the very detailed description of the FIG. 1 embodiment, the description will not be repeated for the FIG. 4 embodiment, except to note several differences between the two embodiments.

One difference which is unrelated to the present invention is that the valve housing portion 121 defines an inlet port 153 and an outlet port 154 no outlet port having been shown in the FIG. 1 embodiment. In the FIG. 4 embodiment, the spool valve 57 has been replaced by a rotary disc valve 157 having a recessed area 159 in communication with the inlet port 153, and an annular groove 161 in continuous communication with the outlet port 154. The valve member 157 defines valve passages 163 and 165, communicating with the recess 159 and annular groove 161 respectively. The rotary valve arrangement shown in the FIG. 4 embodiment is well known in the art, is in widespread commercial use, and is illustrated and described in greater detail in U.S. Pat. No. 3,572,983, assigned to the assignee of the present invention and incorporated herein by reference.

The other major difference between the embodiments of FIG. 1 and FIG. 4, and which does relate to the present invention, is the different means of support for the intermediate shaft 197. In the FIG. 4 embodiment, the first gerotor comprises a displacement mechanism having sufficient displacement and therefore, axial length, that separate means for supporting the intermediate shaft 197 are unnecessary. Instead, the star 149 defines a set of straight internal splines 171, toward the left end of the star 149, and in addition, a set of straight internal splines 172, toward the right end of the star 149. The intermediate shaft 197 in the FIG. 4 embodiment, rather than having several separate sets of external splines, has only a single set of straight external splines 199 which extend substantially the entire axial length of the shaft 197, such that the external splines 199 engage the internal splines 171, 172, and 195.

It is believed to be within the ability of one of ordinary skill in the art to determine, for a given displacement of the first gerotor, whether the axial length is sufficient to permit the use of the FIG. 4 embodiment, not requiring a third gerotor or separate support means, or whether it is necessary to use the FIG. 1 embodiment, including the separate third gerotor, disposed between the first and second gerotors.

In both of the embodiments described herein, the second gerotor (reduction gerotor) had a number of teeth, both internal and external, greater by one than the number of internal and external teeth, respectively, in the first gerotor (motoring gerotor). It should be apparent to one skilled in the art from a reading and understanding of this specification that M does not have to be one greater than N, but instead, may be greater than N by two or more (in which case the reduction factor R decreases) or M may be less than N. For example, if the first and second gerotors in the subject embodiments were reversed, and M were less than N by one, the reduction factor R would be minus 9, i.e., the speed of rotation of the output shaft would be one-ninth the speed of rotation of the motoring star, with the minus sign indicating rotation in the opposite direction.

It is preferable, however, for M to be greater than N, i.e., the reduction gerotor to have more teeth than the motoring gerotor, because the result will be that the reduction gerotor will be larger, thereby improving the ability of the reduction gerotor to withstand the contact stresses between the internal and external teeth.

The present invention has been described in detail sufficient to enable one skilled in the art to make and use the same. Obviously, certain alterations and modifications of the invention will occur to others upon a reading and understanding of the specification, and it is intended that all such alterations and modifications are a part of the invention, in so far as they come within the scope of the appended claims.

I claim:

1. A rotary fluid pressure device of the type including housing means defining fluid inlet means and fluid outlet means; a first positive displacement mechanism associated with said housing means and including an internally-toothed member fixed relative to said housing means and having a plurality (N+1) of internal teeth, and an externally-toothed member having a plurality (N) of external teeth, said externally-toothed member being disposed within said internally-toothed member at an eccentricity ($E_1$) for relative orbital and rotational movement therein, the teeth of said members interengaging to define expanding and contracting fluid volume chambers during said relative movement therebetween; valve means disposed within said housing means; and a second positive displacement mechanism associated with said housing means and including an internally-toothed member having a plurality (M+1; wherein N does not equal M) of internal teeth, and an externally-toothed member having a plurality (M) of external teeth, said externally-toothed member of said second displacement mechanism being disposed within said internally-toothed member of said second displacement mechanism at an eccentricity ($E_2$; wherein $E_1$ is equal to $E_2$) for orbital and rotational movement relative thereto, the teeth of said members of said second displacement mechanism interengaging to define expanding and contracting chambers during said relative movement, input-output shaft means associated with said housing means and rotatably supported for only rotational movement, said internally-toothed member of said second displacement mechanism being fixed relative to said input-output shaft means for rotational movement therewith; intermediate shaft means in engagement with said externally-toothed members of each of said first and second displacement mechanisms for orbital and rotational movement therewith; characterized by:

(a) said valve means being operable to communicate fluid from said fluid inlet means substantially only to said expanding fluid volume chambers of said first displacement mechanism and from substantially only said contracting fluid volume chambers of said first displacement mechanism to said fluid outlet means whereby said input-output shaft means rotates at a speed which is reduced from the speed of rotation of said externally-toothed member of said first displacement mechanism by a reduction factor (R) wherein:

$$R = \frac{M+1}{M-N}.$$

2. A rotary fluid pressure device as claimed in claim 1, characterized by:

(a) a third displacement mechanism associated with said housing means and including an internally-toothed member fixed relative to said housing means and having a plurality (N+1) of internal teeth, and an externally-toothed member having a plurality (N) of external teeth, said externally-toothed member being disposed within said internally-toothed member at an eccentricity ($E_3$; wherein $E_3=E_2=E_1$) for relative orbital and rotational movement therein, the teeth of said members interengaging to define expanding and contracting chambers during said relative movement;

(b) said externally-toothed member of said third displacement mechanism being in engagement with said intermediate shaft means to absorb reaction forces transmitted to said intermediate shaft means.

3. A rotary fluid pressure device as claimed in claim 2, characterized by said third displacement mechanism being disposed axially intermediate said first and second displacement mechanisms.

4. A rotary fluid pressure device as claimed in claim 2, characterized by said intermediate shaft means comprising a shaft member defining first, second and third sets of external splines and said externally-toothed members of said first, second and third displacement mechanisms defining first, second and third sets of internal splines, respectively, in engagement with said first, second and third sets of external splines, respectively.

5. A rotary fluid pressure device as claimed in claim 1, characterized by support means disposed axially intermediate said first and second displacement mechanisms and operable to support said intermediate shaft means, and absorb reaction forces transmitted thereto, as said intermediate shaft means orbits and rotates.

6. A rotary fluid pressure device as claimed in claim 2, characterized by said internally-toothed members of said first and third displacement mechanisms comprising common members.

7. A rotary fluid pressure device as claimed in claim 6, characterized by the internal teeth of said internally-toothed members of said first and third displacement mechanisms comprising a plurality (N+1) of generally cylindrical roller members, each of said members comprising an internal tooth of both said first and third displacement mechanisms.

8. A rotary fluid pressure device as claimed in claim 1, characterized by said internally-toothed member of said second displacement mechanism having a greater number of teeth than the internally-toothed member of said first displacement mechanism.

9. A rotary fluid pressure device as claimed in claim 1, characterized by said valve means comprising a stationary valve means defining fluid passage means in fluid communication with said expanding and contracting fluid volume chambers and a rotary valve member being movable in synchronism with one of said movements of said externally-toothed member of said first displacement mechanism, said rotary valve member defining valve passage means providing fluid communication between said fluid inlet and outlet means and said fluid passage means.

10. A rotary fluid pressure device as claimed in claim 9 characterized by said rotary valve member being movable in synchronism with said rotational movement of said externally-toothed member of said first displacement mechanism.

11. A rotary fluid pressure device of the type including housing means defining fluid inlet means and fluid outlet means; a first positive displacement mechanism associated with said housing means and including an internally-toothed member fixed relative to said housing means and having a plurality (N+1) of internal teeth, and an externally-toothed member having a plurality (N) of external teeth, said externally-toothed member being disposed within said internally-toothed member at an eccentricity ($E_1$) for relative oribital and rotational movement therein, the teeth of said members interengaging to define expanding and contracting fluid volume chambers during said relative movement therebetween; valve means disposed within said housing means; and a second positive displacement mechanism associated with said housing means and including an internally-toothed member having a plurality (M+1; wherein M does not equal N) of internal teeth, and an externally-toothed member having a plurality (M) of external teeth, said externally-toothed member of said second displacement mechanism being disposed within said internally-toothed member of said second displacement mechanism at an eccentricity ($E_2$; wherein $E_1$ is equal to $E_2$) for orbital and rotational movement relative thereto, the teeth of said members of said second displacement mechanism interengaging to define expanding and contracting chambers during said relative movement, input-output shaft means associated with said housing means and rotatably supported for only rotational movement, said internally-toothed member of said second displacement mechanism being fixed relative to said input-output shaft means for rotational movement therewith; intermediate shaft means in engagement with said externally-toothed members of each of said first and second displacement mechanisms for orbital and rotational movement therewith; characterized by:

(a) said valve means being operable to communicate fluid from said fluid inlet means to said expanding fluid volume chambers of said first displacement mechanism and from said contracting fluid volume chambers of said first displacement mechanism to said fluid outlet means whereby said input-output shaft means rotates at a speed which is reduced from the speed of rotation of said externally-toothed member of said first displacement mechanism by a reduction factor (R) wherein:

$$R = \frac{M + 1}{M - N};$$

and (b) support means, in surrounding relation to said intermediate shaft means, associated with said intermediate shaft means and disposed axially intermediate said first and second displacement mechanisms, said support means being operable to absorb reaction forces transmitted to said intermediate shaft means from said second displacement mechanism.

12. A rotary fluid pressure device as claimed in claim 11, characterized by said support means comprising a third displacement mechanism associated with said housing means and including an internally-toothed member fixed relative to said housing means and having a plurality (N+1) of internal teeth, and an externally-toothed member having a plurality (N) of external teeth, said externally-toothed member being disposed within said internally-toothed member at an eccentricity ($E_3$; wherein $E_3 = E_2 = E_1$) for relative orbital and rotational movement therein.

13. A rotary fluid pressure device as claimed in claim 12 characterized by said intermediate shaft means comprising a shaft member defining first, second and third sets of external splines and said externally-toothed members of said first, second and third displacement mechanisms defining first, second and third sets of internal splines, respectively, in engagement with said first, second and third sets of external splines, respectively.

14. A rotary fluid pressure device as claimed in claim 12 characterized by said internally-toothed members of said first and third displacement mechanisms comprising common members.

* * * * *